(12) United States Patent
Jaussaud et al.

(10) Patent No.: US 11,993,143 B2
(45) Date of Patent: May 28, 2024

(54) FUEL GAS SYSTEM FOR A VEHICLE

(71) Applicant: VOLVO TRUCK CORPORATION, Gothenburg (SE)

(72) Inventors: Jean-Paul Jaussaud, Luzinay (FR); Dominique Roberge, Cairon (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 341 days.

(21) Appl. No.: 17/597,201

(22) PCT Filed: Jul. 2, 2019

(86) PCT No.: PCT/EP2019/067740
§ 371 (c)(1),
(2) Date: Dec. 29, 2021

(87) PCT Pub. No.: WO2021/001027
PCT Pub. Date: Jan. 7, 2021

(65) Prior Publication Data
US 2022/0242224 A1 Aug. 4, 2022

(51) Int. Cl.
*B60K 15/03* (2006.01)
*B60H 1/32* (2006.01)
(Continued)

(52) U.S. Cl.
CPC ..... *B60K 15/03006* (2013.01); *B60H 1/3232* (2013.01); *B60K 15/04* (2013.01);
(Continued)

(58) Field of Classification Search
CPC .................. B60H 1/3232; B60K 15/04; B60K 2015/03019; F02M 21/0224; F17C 7/00;
(Continued)

(56) References Cited

U.S. PATENT DOCUMENTS 11,506,342 B1* 11/2022 Elgowainy ................ F17C 9/04
2010/0098130 A1* 4/2010 Kanie ............... H01M 8/04686
374/1
(Continued)

FOREIGN PATENT DOCUMENTS

DE 19531122 A1 2/1997
DE 102010020476 A1 11/2011
(Continued)

OTHER PUBLICATIONS

International Search Report and Written Opinion dated Mar. 11, 2020 in corresponding International PCT Application No. PCT/EP2019/067740, 8 pages.
(Continued)

*Primary Examiner* — Erez Gurari
(74) *Attorney, Agent, or Firm* — Venable LLP; Jeffri A. Kaminski

(57) ABSTRACT

The fuel gas system (100) for a vehicle (1) comprises: —a filling device (50) having an outlet pipe (56); —a first circuit (11) for providing fuel gas to an engine (8) of the vehicle, and including: —a first tank (12); —a first supply line (13) connecting the first tank (12) and the engine (8); —a first filling pipe (14) connecting the filling device outlet pipe to the first tank (12); —a second circuit (21) for providing fuel gas to a thermic device (9) capable of heating, cooling or refrigerating, the second circuit (21) including: —a second tank (22); —a second supply line (23) connecting the second tank (22) to the thermic device (9); —a second filling pipe (24) connecting the filling device outlet pipe (56) to the second tank (22). The first circuit (11) and the second circuit (21) are configured to be in fluid communication: —in a filling phase, when fuel gas flows in the first and second filling pipes (14, 24) from the filling device (50) towards the first and second tanks (12, 22); —and in a working phase,
(Continued)

when fuel gas flows in the first and second supply lines (13, 23) from the first and second tanks (12, 22).

14 Claims, 1 Drawing Sheet

(51) Int. Cl.
*B60K 15/04* (2006.01)
*B60K 15/077* (2006.01)
*B62D 33/06* (2006.01)
*F02M 21/02* (2006.01)
*F17C 7/00* (2006.01)

(52) U.S. Cl.
CPC ............ *B60K 15/077* (2013.01); *B62D 33/06* (2013.01); *F02M 21/0224* (2013.01); *F17C 7/00* (2013.01); *B60K 2015/03013* (2013.01); *B60K 2015/03019* (2013.01); *B60K 2015/03026* (2013.01); *B60K 2015/03131* (2013.01); *F17C 2201/056* (2013.01); *F17C 2205/0142* (2013.01); *F17C 2205/0335* (2013.01); *F17C 2205/0352* (2013.01); *F17C 2221/012* (2013.01); *F17C 2221/033* (2013.01); *F17C 2221/035* (2013.01); *F17C 2223/0123* (2013.01); *F17C 2223/013* (2013.01); *F17C 2227/0302* (2013.01); *F17C 2227/0337* (2013.01); *F17C 2250/03* (2013.01); *F17C 2265/066* (2013.01); *F17C 2270/0171* (2013.01); *F17C 2270/0176* (2013.01)

(58) Field of Classification Search
CPC .......... F17C 2221/012; F17C 2221/033; F17C 2221/035; F17C 2223/0123; F17C 2227/0337; F17C 2250/03; F17C 2265/066; F17C 2270/0171; F17C 2270/0176
See application file for complete search history.

(56) References Cited

U.S. PATENT DOCUMENTS

| | | | | |
|---|---|---|---|---|
| 2010/0108038 | A1* | 5/2010 | Kang | F02M 21/0209 123/529 |
| 2010/0193070 | A1* | 8/2010 | Allidieres | F17C 5/06 141/11 |
| 2012/0317980 | A1* | 12/2012 | Gilmore | B60H 1/3226 60/508 |
| 2016/0146400 | A1* | 5/2016 | Allidieres | F17C 5/007 141/82 |
| 2019/0301678 | A1* | 10/2019 | Yamaguchi | F17C 13/025 |
| 2020/0164785 | A1* | 5/2020 | Renault | F25D 11/003 |
| 2020/0208563 | A1* | 7/2020 | Renault | F01P 7/165 |
| 2020/0232685 | A1* | 7/2020 | Swab | F02D 41/22 |
| 2021/0341101 | A1* | 11/2021 | Allidieres | F25J 1/0254 |
| 2022/0242224 | A1* | 8/2022 | Jaussaud | B60K 15/04 |
| 2023/0278392 | A1* | 9/2023 | Makwinski | B60H 1/00492 62/132 |
| 2023/0294486 | A1* | 9/2023 | Renault | F02B 43/12 62/50.3 |
| 2023/0347872 | A1* | 11/2023 | Gesang | B60L 7/18 |
| 2023/0391185 | A1* | 12/2023 | Kvist | B60K 15/013 |

FOREIGN PATENT DOCUMENTS

| | | |
|---|---|---|
| WO | 2017192570 A1 | 11/2017 |
| WO | 2019034903 A1 | 2/2019 |

OTHER PUBLICATIONS

International Preliminary Report on Patentablility dated Jan. 13, 2022 in corresponding International PCT Application No. PCT/EP2019/067740, 7 pages.

\* cited by examiner

FUEL GAS SYSTEM FOR A VEHICLE

CROSS-REFERENCE TO RELATED APPLICATIONS

This application is a U.S. National Stage application of PCT/EP2019/067740, filed Jul. 2, 2019, and published on Jan. 7, 2021, as WO 2021/001027 A1, all of which is hereby incorporated by reference in its entirety.

TECHNICAL FIELD

The invention relates to a fuel gas system for a vehicle.

The invention can be applied in light, medium and heavy-duty vehicles, such as trucks, buses and coaches.

BACKGROUND

Some vehicles use fuel gas as fuel, instead of diesel or gasoline for example, which has the advantage of causing less pollution.

Fuel gas can be used both to run the vehicle engine and to run a thermic device, such as a device providing cooling, heating or refrigeration to a cargo portion of the vehicle, and/or for providing cooling or heating to a driver's compartment of the vehicle. In such an arrangement, the vehicle is equipped with one circuit for providing fuel gas to the engine, and one circuit for providing fuel gas to the thermic device, each circuit including its own separate tank for storing fuel gas.

In some countries, it is a legal requirement that the thermic device does not affect the operation of the engine. In other words, the supply of fuel gas to the engine should always be sufficient to meet the current needs, which could mean temporarily limiting or stopping the flow of fuel gas provided to the thermic device.

For that purpose, it has been proposed to separate the two fuel gas circuits to ensure there is always enough fuel gas provided to the engine, as long as the corresponding tank is not empty.

More specifically, in a vehicle equipped with a fuel gas system of the prior art, there are provided check valves which operates as follows:

when a user refuels the fuel gas system, the fuel gas provided through a filling device flows towards both tanks, via a common filling point of the two circuits, this being allowed by the mounting arrangement of the check valves;

on the contrary, when fuel gas is to be used by the engine and/or by the thermic device, the check valves prevent fuel gas from flowing towards a common point of the two circuits, in order to separate the two circuits.

Such a known arrangement allows complying with the legal requirements. However, it further has a significant disadvantage as explained below.

Depending on the operating conditions, the fuel gas consumed by the engine and by the thermic device may greatly vary. Generally speaking, the engine has a higher consumption than the thermic engine. However, the thermic engine may be running even if the engine is not running, for example if the vehicle is stopped but the cargo portion is to be kept at a low temperature. Or the thermic engine may be stopped while the engine is still running, for example if the cargo portion is empty, when all goods have been delivered, and the vehicle is ending its delivery tour.

It results from the above that one tank may be empty while the other one still contains fuel gas, sometimes even a fairly significant amount of fuel gas. Then, the user is obliged to refuel the empty tank which operation also refills the other tank although fuel gas remains, insofar as the remaining fuel gas is not available because it is contained in the other tank.

With this fuel gas system of the prior art, refuelling is required fairly often, which impairs autonomy.

SUMMARY

An object of the invention is to provide a fuel gas system for a vehicle with an improved autonomy, while still complying with the legal requirements.

According to a first aspect, the invention relates to a fuel gas system for a vehicle which comprises:
  a filling device having an outlet pipe;
  a first circuit for providing fuel gas to an engine of the vehicle, the first circuit including:
    a first tank;
    a first supply line connected to the first tank, and configured to be connected to the engine;
    a first filling pipe connecting the filling device outlet pipe to the first tank;
  a second circuit for providing fuel gas to a thermic device capable of heating, cooling or refrigerating, the second circuit including:
    a second tank;
    a second supply line connected to the second tank, and configured to be connected to the thermic device;
    a second filling pipe connecting the filling device outlet pipe to the second tank; wherein the first circuit and the second circuit are configured to be in fluid communication in a filling phase, when fuel gas flows in the first and second filling pipes from the filling device towards the first and second tanks, and wherein the first circuit and the second circuit are configured to be in fluid communication in a working phase, when fuel gas flows in the first and second supply lines from the first and second tanks.

Thus, the first and second circuits are connected even in the working phase. This allows pressure in the first circuit and pressure in the second circuit to equalize. Thus, if fuel gas is consumed in the first circuit, pressure in said first circuit will first decrease, but subsequently pressure in first and second tanks will equalize. This results in maintaining substantially similar filling levels in both tanks, which thus become empty at the same time. This ultimately enables increasing the time interval between refuelings, and therefore improving autonomy.

By "the circuits are in fluid communication" is meant that there is a way for the fuel gas to flow between the circuits, this passage not being blocked.

Even if the first tank and second tanks are separate, in the fuel gas system of the invention, the first and second circuits form a common fluid circuit both in the filling phase and in the working phase.

It has been calculated that providing such a common fluid circuit does not impair the proper operation of the fuel gas system, in particular with respect to the regulations, running the engine remaining a priority over running the thermic device.

In an embodiment, the first filling pipe and the second filling pipe are configured to allow fluid flow in both directions. For example, each of the first filling pipe and the second filling pipe can be devoid of check valve or other valve which allows fluid (liquid or gas) to flow through it in only one direction.

In an embodiment, the diameter of the first supply line is at least 3 mm, or at least 6 mm, for example around 10 mm.

More generally, the diameter of the first supply line can be large enough to allow a flow rate of fuel gas that is higher than the maximum amount of fuel gas that the engine can consume. With such a dimensioning, one can make sure the legal requirements are always met regarding the gas supplied to the engine as previously explained, all the more as the consumption of the thermic device is generally far lower than the consumption of the engine. In other words, such a dimensioning ensures that the thermic device does not affect the operation of the engine.

In an embodiment, the diameter of the second supply line is at least 3 mm, or at least 6 mm, for example around 10 mm.

The diameters of the first supply line and second supply line can be identical or not.

The first filling pipe can be connected to the first supply line; the second filling pipe can be connected to the second supply line.

In an embodiment, the filling device comprises a filling nozzle and a check valve allowing fluid to flow towards the first and second tanks.

The first tank and/or the second tank may comprise N containers, N being comprised between 1 and 10, the containers of one given tank being in fluid communication and being preferably arranged in one common housing. In a non-limiting example, N=4.

The first circuit may comprise a first electric control system and the second circuit may comprise a second electric control system separate from the first electric control system. With this embodiment, although the circuits can be common as regards the flow of fuel gas, the circuits remain electrically separate, which allows controlling each circuit independently according to the current needs.

According to a second aspect, the invention relates to an assembly comprising:
 a fuel gas system as previously described;
 an engine connected to the first supply line;
 a thermic device capable of heating, cooling or refrigerating, the thermic device being connected to the second supply line.

According to a third aspect, the invention relates to a vehicle, in particular a bus, a truck or a coach, comprising an assembly as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
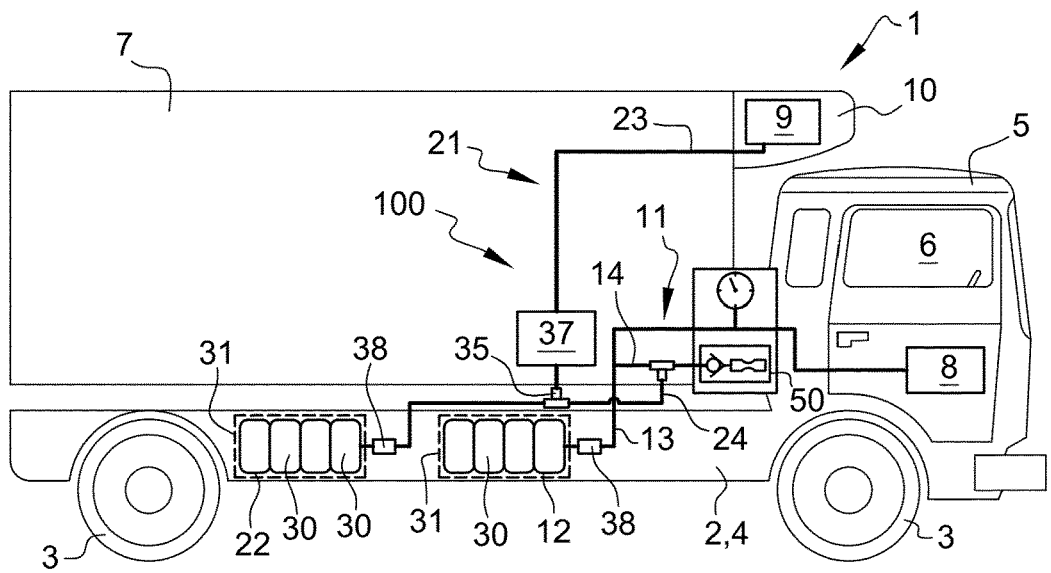
FIG. 1 is a side view of a vehicle comprising a fuel gas system according to an embodiment of the invention.
Figure 2:
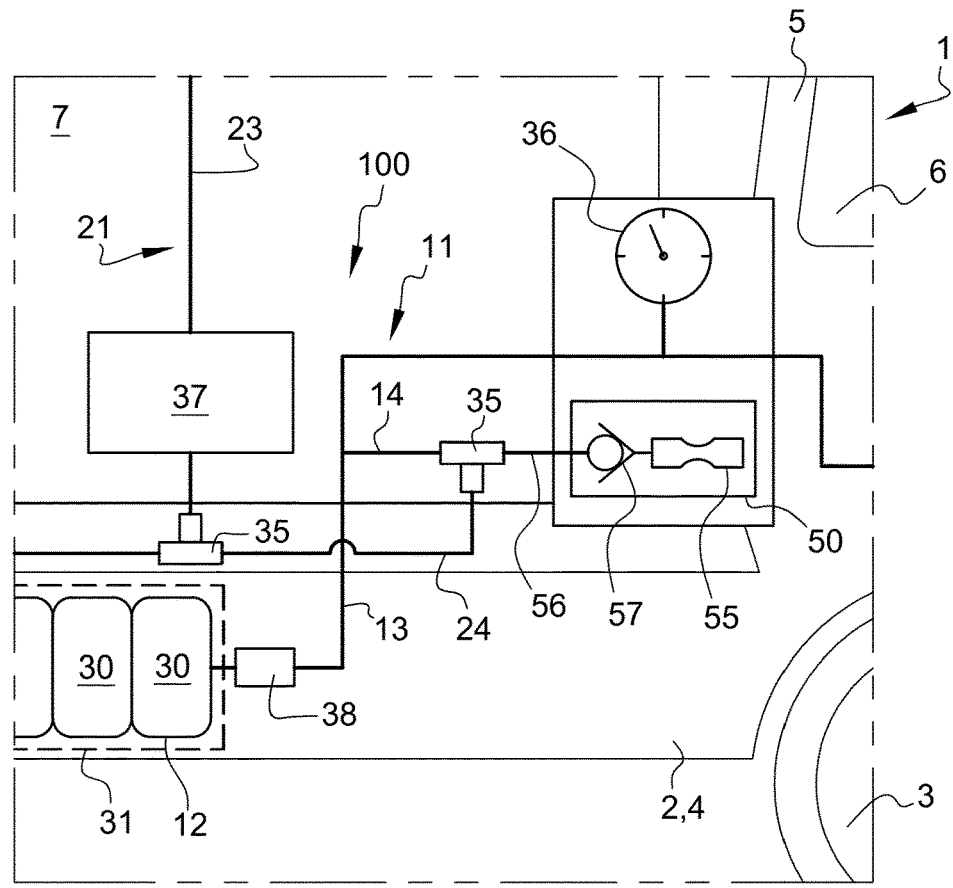
FIG. 2 is a partial enlarged view of FIG. 1.

FIG. 1 shows a vehicle 1 which comprises a chassis 2 supported by wheels 3, wherein the chassis may comprise two longitudinal beams 4 arranged on opposite sides of the vehicle 1. A cab 5 defining a driver's compartment 6 is mounted on the chassis 2, on the front. The vehicle may further include a cargo portion 7 for transporting goods.

Although the vehicle 1 illustrated in FIG. 1 is a truck, the invention is not limited to this specific embodiment, but can also be implemented on other vehicles, such as a bus or a coach, for example.

The vehicle 1 comprises an engine 8 for moving the vehicle. The vehicle 1 further comprises a thermic device 9 capable of heating, cooling or refrigerating. The thermic device 9 may be intended:
 to cool the driver's compartment 6 or the cargo portion 7;
 to refrigerate the cargo portion 7;
 and/or to heat the driver's compartment 6 or the cargo portion 7.

The thermic device 9 may be arranged in a casing 10 located outside the cargo portion 7, on the top front part thereof, above the cab 5.

The vehicle 1 uses fuel gas as fuel. The fuel gas can comprise compressed fuel gas or liquid fuel gas. The gas can be natural gas, such as methane, or hydrogen, or liquefied petroleum gas (LPG). Therefore, the vehicle 1 includes a fuel gas system 100 for carrying fuel gas towards the relevant components of the vehicle 1.

Basically, the fuel gas system 100 includes a filling device 50 through which a user can refuel the vehicle storage with fuel gas, a first circuit 11 for providing fuel gas to the engine 8, and a second circuit 21 for providing fuel gas to the thermic device 9.

The first circuit 11 includes a first tank 12, and the second circuit 21 includes a second tank 22. The first tank 12 and/or the second tank 22 can comprise one or several containers 30, for example four containers according to a non-limiting embodiment. The containers 30 of one given tank 12, 22 are in fluid communication with each other. The containers 30 of one given tank 12, 22 may be arranged in one common housing 31. For example, at least one of the first tank 12 and of the second tank 22 can have a capacity of around 400 l of fuel gas under a maximum pressure of 200 bars.

The first tank 12 and/or the second tank 22 can be arranged on one or each longitudinal beam 4 of the vehicle 1. Alternatively, the first tank 12 and/or the second tank 22 can be located behind the cab (5), on the vehicle roof, or in another appropriate location.

The filling device 50 has a filling nozzle 55, an outlet pipe 56, and a check valve 57 arranged on the outlet pipe 56 for allowing fluid, namely fuel gas, to flow towards the first and second tanks 21, 22.

The first circuit 11 includes a first supply line 13 which connects the first tank 12 to the engine 8, and a first filling pipe 14 which connects the outlet pipe 56 of the filling device 50 to the first tank 12. The first filling pipe 14 may be connected to the first supply line 13.

The second circuit 21 includes a second supply line 23 which connects the second tank 22 to the thermic device 9, and a second filling pipe 24 which connects the outlet pipe 56 of the filling device 50 to the second tank 22. The second filling pipe 24 may be connected to the second supply line 23.

A T pipe member 35 may be provided at the junction between the first filling pipe 14 and the second filling pipe 24, between the first supply line 13 and the first filling pipe 14, and/or between the second supply line 23 and the second filling pipe 24.

The fuel gas system 100 may further comprise other components such as:
 a manometer 36, which can for example be arranged to sense the fuel gas pressure on the first supply line 13;

a set of fluid components which can include one or several of: a further manometer, a pressure regulator, a filter. These components can be housed in a box 37 provided on the second supply line 23;

a set 38 of fluid components located substantially immediately downstream of the first tank 12 and/or of the second tank 22. This set 38 can include one or several of: an excess flow valve, an electrovalve, a manual valve, a check valve. This set 38 can be housed in the corresponding common housing 31 or outside said common housing 31.

The fuel gas system 100 may include an electric control system for controlling the fuel gas flow provided to the engine 8 and to the thermic device 9 depending on the current needs and operational conditions. Preferably, the first circuit 11 comprises a first electric control system and the second circuit 21 comprises a second electric control system separate from the first electric control system. Having two separate electric control systems makes fuel gas flow control easier and more reliable. It further prevents potentially detrimental interferences between the two systems and ultimately increases safety.

As can be seen in the figures, each of the first filling pipe 14 and the second filling pipe 24 can be devoid of check valve. In other words, with this arrangement, the first filling pipe 14 and the second filling pipe 24 are configured to allow fluid flow in both directions, namely:

from the filling device 50 towards the tanks 12, 22, in a filling phase, when a user is refuelling the vehicle 1;

and from the tanks 12 and/or 22 (depending on the current needs) towards the engine 8, respectively the thermic device 9, in a working phase.

While the first circuit 11 and the second circuit 21 are preferably separate with regard to electric control, they are common with regard to fluid communication, both in the filling phase and in the working phase.

Thus, the first circuit 11 and the second circuit 21—or the first filling pipe 14 and the second filling pipe 24—are configured to be in fluid communication:

in the filling phase, when fuel gas flows in the first and second filling pipes 14, 24 from the filling device 50 towards the first and second tanks 12, 22 and in the working phase, when fuel gas flows in the first and second supply lines 13, 23 from the first and second tanks 12, 22, towards the engine 8 and the thermic device 9, respectively.

Owing to this arrangement, the pressures can equalize in the first circuit 11 and in the second circuit 21, through the supply lines 14, 24, which allow fuel gas to flow from one tank to the other, partly in a direction opposite the flow of fuel gas during the filling phase.

This means that a situation in which one tank is empty and the other one still contains enough fuel gas to be supplied cannot occur. As a result, all fuel gas initially contained in both the first tank 12 and the second tank 22 can be used to supply either the engine 8 or the thermic device 9, until both tanks are substantially empty. Ultimately, with such a fuel gas system 100, refuelling the tanks 12, 22 is required less often, which is a significant advantage in terms of vehicle autonomy.

Moreover, such a fuel gas system 100 does not impair the proper operation of the vehicle 1. In particular the fuel gas system 100 ensures that the engine 8 is always supplied with enough fuel gas, when required, even if, for that purpose, the thermic device 9 must not receive fuel gas.

Given the maximum fuel gas consumption of the engine 8, the pipes are dimensioned to always provide a sufficient flow of fuel gas towards the engine 8. Besides, as the thermic device maximum consumption is generally very low compared to the vehicle engine maximum consumption, the sizing of the second supply line 23 has little impact on the fuel gas flow that is actually supplied to the engine 8.

In a non-limiting embodiment, the diameter of the first supply line 13 is at least 3 mm, or at least 6 mm, for example around 10 mm. With such diameters, the fuel gas flow provided to the engine 8 can always be higher than the engine maximum needs.

In a non-limiting embodiment, the diameter of the second supply line 23 is at least 3 mm, or at least 6 mm, for example around 10 mm. With such diameters, the fuel gas flow provided to the engine 8 can always meet the engine current needs, even if fuel gas is simultaneously supplied to the thermic device 9.

It is to be understood that the present invention is not limited to the embodiments described above and illustrated in the drawings; rather, the skilled person will recognize that many changes and modifications may be made within the scope of the appended claims.

The invention claimed is:

1. A fuel gas system for a vehicle, comprising:
a filling device having an outlet pipe;
a first circuit for providing fuel gas to an engine of the vehicle, the first circuit including:
a first tank;
a first supply line connected to the first tank, and configured to be connected to the engine;
a first filling pipe connecting the filling device outlet pipe to the first tank;
a second circuit for providing fuel gas to a thermic device capable of heating, cooling or refrigerating, the second circuit including:
a second tank;
a second supply line connected to the second tank, and configured to be connected to the thermic device;
a second filling pipe connecting the filling device outlet pipe to the second tank;
wherein the first circuit and the second circuit are configured to be in fluid communication in a filling phase, when fuel gas flows in the first and second filling pipes from the filling device towards the first and second tanks, and wherein the first circuit and the second circuit are configured to be in fluid communication in a working phase, when fuel gas flows in the first and second supply lines from the first and second tanks.

2. The fuel gas system according to claim 1, characterized in that the first filling pipe and the second filling pipe are configured to allow fluid flow in both directions.

3. The fuel gas system according to claim 1, characterized in that each of the first filling pipe and the second filling pipe is devoid of check valve.

4. The fuel gas system according to claim 1, characterized in that the diameter of the first supply line is at least 3 mm, or at least 6 mm, for example around.

5. The fuel gas system according to claim 1, characterized in that the diameter of the second supply line is at least 3 mm, or at least 6 mm, for example around 10 mm.

6. The fuel gas system according to claim 1, characterized in that the first filling pipe is connected to the first supply line.

7. The fuel gas system according to claim 1, characterized in that the second filling pipe is connected to the second supply line.

8. The fuel gas system according to claim 1, characterized in that the filling device comprises a filling nozzle and a check valve allowing fluid to flow towards the first and second tanks.

9. The fuel gas system according to claim 1, characterized in that it comprises compressed fuel gas or liquid fuel gas as the fuel gas, such as natural gas, hydrogen or liquefied petroleum gas.

10. The fuel gas system according to claim 1, characterized in that the first tank and/or the second tank comprise N containers, N being comprised between 1 and 10, the containers of one given tank being in fluid communication with each other and being preferably arranged in one common housing.

11. The fuel gas system according to claim 1, characterized in that the first circuit comprises a first electric control system and in that the second circuit comprises a second electric control system separate from the first electric control system.

12. An assembly comprising:
- a fuel gas system according to claim 1;
- an engine connected to the first supply line;
- a thermic device capable of heating, cooling or refrigerating, the thermic device being connected to the second supply line.

13. A vehicle, in particular a bus, a truck or a coach, comprising an assembly according to claim 12.

14. The vehicle according to claim 13, characterized in that it comprises a cab defining a driver's compartment and a cargo portion, and in that the thermic device is configured to cool the driver's compartment or the cargo portion, to refrigerate the cargo portion, and/or to heat the driver's compartment or the cargo portion.

* * * * *